(12) United States Patent
Matsuoka et al.

(10) Patent No.: US 8,569,623 B2
(45) Date of Patent: Oct. 29, 2013

(54) WATERPROOF JOINT SECTION FORMING METHOD AND WIRE HARNESS PROVIDED WITH WATERPROOF JOINT SECTION FORMED BY THE METHOD

(75) Inventors: Katsushi Matsuoka, Yokkaichi (JP); Naohito Sawamura, Yokkaichi (JP)

(73) Assignee: Sumitomo Wiring Systems, Ltd. (JP)

( * ) Notice: Subject to any disclaimer, the term of this patent is extended or adjusted under 35 U.S.C. 154(b) by 293 days.

(21) Appl. No.: 12/744,741

(22) PCT Filed: Jun. 25, 2008

(86) PCT No.: PCT/JP2008/061549
§ 371 (c)(1),
(2), (4) Date: May 26, 2010

(87) PCT Pub. No.: WO2009/078188
PCT Pub. Date: Jun. 25, 2009

(65) Prior Publication Data
US 2010/0300748 A1    Dec. 2, 2010

(30) Foreign Application Priority Data
Dec. 14, 2007    (JP) .................................. 2007-323694

(51) Int. Cl.
*H02G 15/02*    (2006.01)
(52) U.S. Cl.
USPC ........................ 174/74 R; 174/77 R; 174/78
(58) Field of Classification Search
USPC ...................... 174/74 R, 74 A, 76, 84 R, 88 R
See application file for complete search history.

(56) References Cited

U.S. PATENT DOCUMENTS

| 3,109,051 | A | * | 10/1963 | Vogel | 174/87 |
| 3,597,528 | A | * | 8/1971 | Penfield et al. | 174/87 |
| 5,162,617 | A | * | 11/1992 | Ferbas | 174/138 F |
| 5,201,667 | A | | 4/1993 | Endo et al. | |
| 5,210,376 | A | * | 5/1993 | Caviar | 174/87 |
| 5,252,779 | A | * | 10/1993 | DiRienzo | 174/87 |
| 5,427,270 | A | * | 6/1995 | Patterson | 174/135 |
| 5,641,943 | A | * | 6/1997 | Sawamura | 174/74 A |
| 6,051,791 | A | * | 4/2000 | King | 174/87 |

(Continued)

FOREIGN PATENT DOCUMENTS

| JP | 36-22460 | 8/1961 |
| JP | 38-24359 | 11/1963 |

(Continued)

*Primary Examiner* — William H Mayo, III
(74) *Attorney, Agent, or Firm* — Gerald E. Hespos; Michael J. Porco; Matthew T. Hespos

(57) ABSTRACT

Leading end sides of a plurality of wires to be electrically connected with each other are respectively inserted through a plurality of through holes formed in a waterproof rubber lid and the outer circumferential surfaces of insulating coatings of the respective wires are held in close contact with the inner circumferential surfaces of the respective through holes for sealing. The insulating coatings are peeled off at the passed-through ends of the wires to expose cores. The exposed cores are welded, fusion-bonded, soldered or fastened by a crimping terminal to form a terminal joint section. The terminal joint section is inserted into a protection cap made of a bottomed resin molding through an opening end. The waterproof rubber lid is fitted to an opening end of the protection cap to seal the interior of the protection cap accommodating the terminal joint section without injecting a waterproofing agent into the protection cap.

6 Claims, 7 Drawing Sheets

(56) References Cited

U.S. PATENT DOCUMENTS

RE37,340 E * 8/2001 King, Jr. .......................... 174/87
6,815,616 B1 * 11/2004 King et al. ...................... 174/87
7,262,363 B2 * 8/2007 Fukuda et al. .............. 174/84 R

FOREIGN PATENT DOCUMENTS

| JP | 57-154072 | 9/1982 |
| JP | 5-3057 | 1/1993 |
| JP | 7-99080 | 4/1995 |
| JP | 2005-228603 | 8/2005 |

* cited by examiner

WATERPROOF JOINT SECTION FORMING METHOD AND WIRE HARNESS PROVIDED WITH WATERPROOF JOINT SECTION FORMED BY THE METHOD

BACKGROUND OF THE INVENTION

1. Field of the Invention

The present invention relates to a method for forming a waterproof joint section of a wire harness to be arranged in an automotive vehicle or the like and a wire harness including a waterproof joint section formed by such a method and is particularly designed to treat joined sections at ends of a plurality of wires without using a waterproofing agent.

2. Description of the Related Art

As a method for joining and connecting a plurality of wires constituting a wire harness at their ends, there are a method using a joint connector and a method for forming a terminal joint section by joining exposed core sections at the ends of the wires by welding, fusing or another means. In either case, this joint section needs to be waterproofed in the case of being arranged in a water susceptible area such as an engine compartment.

FIG. 10 shows an example of connection using a joint connector disclosed in Japanese Unexamined Patent Publication No. H05-3057. A joint connector 1 includes a housing 1a provided with a shorting terminal (not shown) by insert molding. After a female terminal 2 connected with an end of a wire w is inserted into the housing 1a and connected with the shorting terminal, a cover 1c is fitted into an opening 1b of the housing 1a and a waterproof plug 3 is mounted at a connected part of the wire w and the female terminal 2 to prevent water penetration into the housing 1a.

However, the joint connector of this type requires the housing 1a formed by molding, is difficult to miniaturize and, in addition, requires a part such as a terminal or a busbar, which increases cost and makes it difficult to deal with a design change. Further, for a waterproof treatment, it is necessary not only to mount the cover 1c onto the housing 1a to prevent direct water penetration, but also to mount the waterproof rubber plug 3 on each wire w to prevent water penetration through clearances inside an insulating coating of the wire w by a capillary action.

On the other hand, FIG. 11 shows an example of connection by forming a terminal joint section disclosed in Japanese Unexamined Patent Publication No. 2005-228603. Insulating coatings 4a at end portions of a plurality of wires 4 are peeled off to expose cores 4b, and a conductive sleeve 5 is crimped and connected to the exposed sections of the cores 4b to form a joint section 6. This joint section 6 is inserted into a bottomed connection cap 7 through an opening 7a, a sealant 8 is injected through a hole 7d formed in a bottom wall 7c of the connection cap 7 to be infiltrated around the joint section and also between the cores 4b and the like by a capillary action with the joint section 6 temporarily fixed by flexible locking arms 7b projecting in the connection cap 7, and then the sealant 8 is hardened. In this way, a waterproof treatment is applied. If the sealant 8 has a high fluidity, it is also possible to inject the sealant through the opening 7a of the connection cap 7.

If the terminal joint section 6 is formed and connected as described above, a housing is not necessary unlike the case of using a joint connector. Thus, miniaturization is possible and a part such as a terminal or a busbar is not necessary, wherefore cost can be reduced and a design change can be easily dealt with.

However, since the liquid sealant 8 is used by being filled into the connection cap 7 for the waterproof treatment, a specified time is required to harden this sealant 8, thereby extending an operation time and, in addition, a space is unnecessary to hold the connection cap 7 in a stable state where no external force acts until the sealant 8 is hardened. Particularly, in order to infiltrate the sealant 8 into the clearances between the cores 4b of the wires 4 and clearances between the cores and the connection cap to fill up these clearances, the sealant 8 needs to have a low viscosity and, in this case, a hardening time becomes even longer, thereby causing a problem that the waterproof treatment cannot be quickly performed.

In view of the above problems, an object of the present invention is to provide a waterproof joint section forming method capable of reducing the number of parts in a waterproofing process, reducing cost for a waterproof treatment, for example, by shortening a waterproof treatment time and easily and reliably performing the waterproof treatment, and a wire harness provided with a waterproof joint section formed by such a method.

SUMMARY OF THE INVENTION

The present invention is directed to a waterproof joint section forming method. The method includes forming slits for peeling in leading end sides of a plurality of insulated wires to be electrically connected with each other, and then inserting the insulated wires respectively through a plurality of through holes formed in a waterproof rubber lid and the outer circumferential surfaces of insulating coatings of the respective wires are held in close contact with the inner circumferential surfaces of the respective through holes for sealing. The method continues by peeling off the insulating coatings at the ends of the respective wires from the slits after being passed through, thereby exposing cores. The exposed cores then are welded, fusion-bonded, soldered or fastened by a crimping terminal to form a terminal joint section. The method proceeds by inserting the terminal joint section into a protection cap made of a bottomed resin molding through an opening end. A waterproof rubber lid then is fit to an opening end of the protection cap. More particularly, a waterproof seal lip formed on the outer circumferential surface of the waterproof rubber lid is pressed into contact with the inner circumferential surface of the opening end of the protection cap for sealing or a waterproof seal lip formed on the inner circumferential surface of the waterproof rubber lid is pressed into contact with the outer circumferential surface of the opening end of the protection cap to seal and accommodate the terminal joint section in the protection cap without injecting a waterproofing agent into the protection cap.

As described above, the waterproof rubber lid is fitted to the opening end of the protection cap and the waterproof seal lip formed on the outer circumferential surface of the waterproof rubber lid is pressed into contact with the inner circumferential surface of the opening end of the protection cap for sealing.

Alternatively, the waterproof seal lip formed on the inner circumferential surface of the waterproof rubber lid may be pressed into contact with the outer circumferential surface of the opening end of the protection cap for sealing.

Since the waterproof rubber lid has a larger thickness and a larger strength than the protection cap, it is preferable to fit the waterproof rubber lid into the protection cap as in the former case.

According to the waterproof joint section forming method according to the present invention, the waterproof rubber lid for closing the opening of the protection cap is used to prevent water penetration into the protection cap and waterproof the terminal joint section inserted in the protection cap instead of a method for filling a waterproofing sealant into the protection cap having the terminal joint section inserted therein.

In addition, by closely inserting the respective wires through the plurality of through holes formed in the waterproof rubber lid, water running on the outer circumferential surfaces of the respective wires can be collectively blocked by one waterproof rubber lid. Therefore, unlike a conventional technique of individually mounting waterproof rubber plugs one by one on wires, it is possible to reduce the number of parts and time and effort for a mounting operation.

As described above, in the present invention, the waterproof rubber lid is fitted to the opening end of the protection cap for sealing and the inner circumferential surfaces of the respective through holes of the waterproof rubber lid and the outer surfaces of the insulating coatings of the respective wires are held in close contact for sealing. Thus, water penetration into the protection cap can be reliably prevented even without injecting a waterproofing agent. Accordingly, unlike a conventional waterproof treatment using a waterproofing agent which is not easily reliably infiltrated into clearances between the cores of the joined wires, the joint section can be easily and reliably waterproofed. Further, time and space for allowing the hardening of the waterproofing agent like the prior art also become unnecessary, wherefore space saving and time shortening can be realized in a waterproofing process and production cost can be reduced.

The protection cap may include a partition wall inside, the plurality of wires inserted through the waterproof rubber lid may be divided into a plurality of groups with a terminal joint section formed for each group, and a plurality of these terminal joint sections are inserted into accommodating portions defined in one protection cap by the partition wall and then the protection cap may be sealed with the waterproof rubber lid.

By separately accommodating the plurality of terminal joint sections into the respective accommodating portions partitioned in the one protection cap by the partition wall so that the terminal joint sections do not touch each other, it becomes possible, for example, to safely accommodate even terminal joint sections of different circuit groups such as a terminal joint section of a ground circuit and a terminal joint section of a power supply circuit in one protection cap.

On the contrary, if a group of wires to be joined is entirely composed of wires for a ground circuit, the interior of the protection cap needs not be partitioned by the partition wall and even two or more joint sections of the ground wires may be accommodated together in one space inside the protection cap.

The present invention is also directed to a wire harness provided with a waterproof joint section formed by any one of the above methods.

The wire harness provided with the waterproof joint section can be made smaller as compared with the case where the waterproof joint section is formed by a joint connector and this joint connector is waterproofed. Thus, a partial enlargement of the wire harness can be suppressed.

Preferably, a locking piece projects from the outer circumferential surface of the waterproof rubber lid and is engaged with an interlocking portion formed at the peripheral wall of the protection cap.

This can reliably prevent detachment and displacement of the waterproof rubber lid. Further, a distortion of the rubber lid and a resulting clearance to the protection cap can be prevented by preventing the rubber lid from being excessively pushed to the back side of the protection cap.

A retainer may be mounted to prevent the detachment of the waterproof rubber lid from the protection cap.

Preferably, the waterproof rubber lid has a circular or rectangular shape, and the opening end of the protection cap is so shaped that the waterproof rubber lid is fittable thereinto or thereonto.

In the case of a circular shape, it may be a right circular, elliptical or oblong. In the case of a rectangular shape, it may be square or rectangular.

The waterproof rubber lid is made of rubber or elastomer.

Preferably, the interior space of the protection cap is narrowed toward a bottom side, and a tongue piece, to which a group of wires drawn out from the protection cap are fixed by taping, projects from the peripheral wall at the opening side.

Specifically, since the terminal joint section of the wire harness is gradually narrowed from the passed-through position at the waterproof rubber lid, the interior space of the protection cap is accordingly narrowed toward the bottom side.

Further, the respective wires are unlikely to be displaced since being closely held in the through holes of the waterproof rubber lid. However, by fixing the wires to the tape winding tongue piece by taping, the wires can be fixed to the protection cap and the waterproof rubber lid even if a tensile force acts on the wire harness from the outside.

As described above, according to the present invention, a plurality of wires are respectively inserted through a plurality of through holes formed in one waterproof rubber lid and the outer circumferential surfaces of the insulating coatings of the respective wires and the inner circumferential surfaces of the through holes are held in close contact for sealing. Thus, it is possible to reduce the number of parts, reduce time and effort for a mounting operation and, in addition, reduce a space taken up by the waterproof rubber lid as compared with the case where a waterproof plug is individually mounted on each wire as before.

Further, by fitting the waterproof rubber lid into or onto the opening end of the protection cap for sealing, the interior of the protection cap can be sealed even without injecting a waterproofing agent into the protection cap. Thus, the joint section can be easily and reliably waterproofed. In addition, time and space for allowing the hardening of the waterproofing agent become unnecessary, wherefore space saving and time shortening can be realized in the waterproofing process and production cost can be reduced.

DETAILED DESCRIPTION OF THE PREFERRED EMBODIMENTS

FIGS. 1 and 2 show a method for forming a waterproof joint section A according to a first embodiment of the present invention and a wire harness provided with the waterproof joint section A.

Figure 1A:
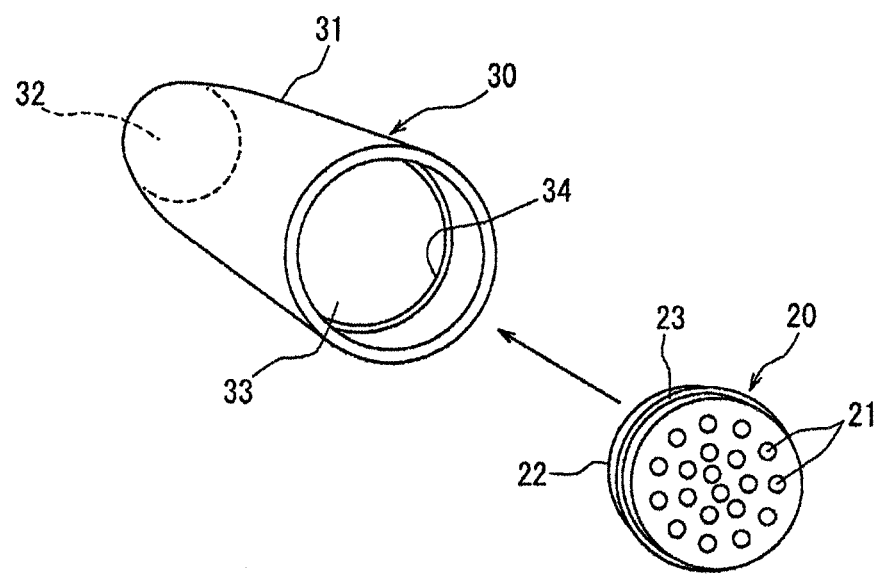
FIGS. 1(A) and 1(B) are a perspective view and a side view showing a waterproof rubber lid and a protection cap according to a first embodiment of the invention.
Figure 1B:
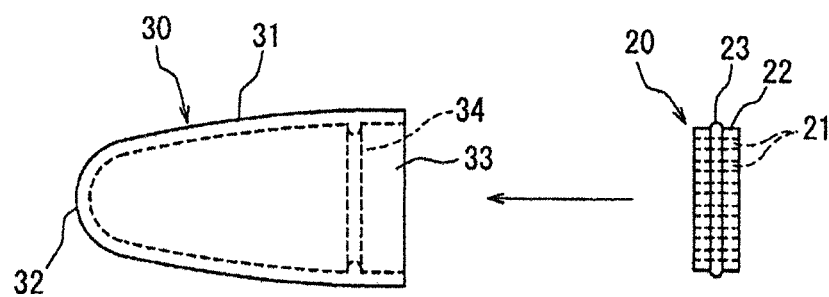
Figure 2A:
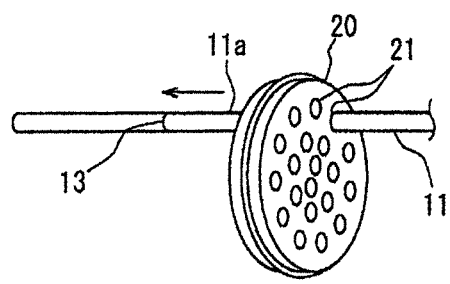
FIGS. 2(A) to 2(D) are perspective views showing a waterproof joint section forming method according to the first embodiment of the invention.
Figure 2B:
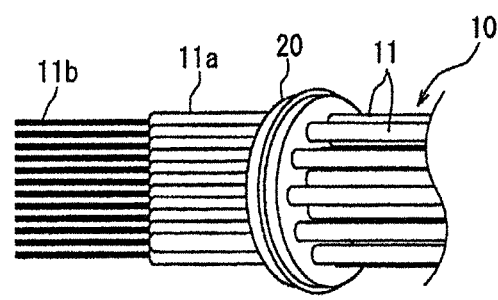
Figure 2C:
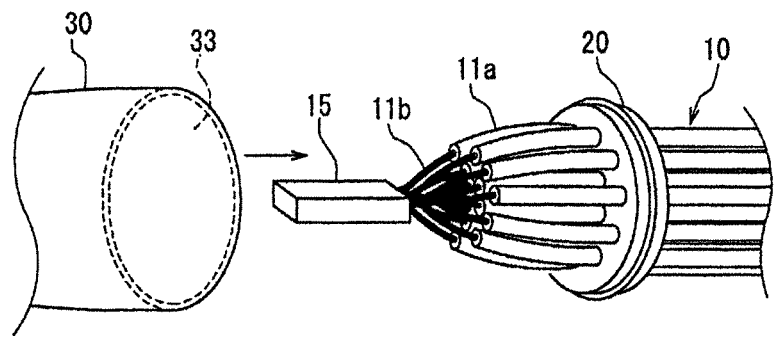
Figure 2D:
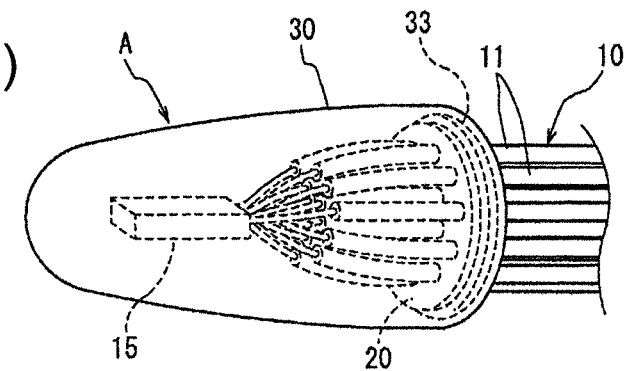

In a wire harness 10 to be arranged in an engine compartment of an automotive vehicle, a plurality of wires for a ground circuit (hereinafter, "ground wires") 11 are electrically connected with each other by forming a joint section 15 at wire ends as shown in FIGS. 2(B) to 2(D) and a waterproof rubber lid 20 and a protection cap 30 shown in FIG. 1 are used to waterproof the joint section 15, whereby the waterproof joint section A is formed.

As shown in FIGS. 1(A) and 1(B), the waterproof rubber lid 20 has a disk shape with a right circular cross section and as many through holes 21 as the ground wires 11 to be joined are formed to penetrate the rubber lid 20 in a thickness direction. The inner diameters of the respective through holes 21 are so set that the through holes 21 are held in close contact with the outer circumferential surfaces of insulating coatings 11a of the wires 11 inserted therethrough. A waterproof seal lip 23 continuously extending in a circumferential direction projects from an outer circumferential surface 22 of the waterproof rubber lid 20 over the entire circumference.

As shown in FIGS. 1(A) and 1(B), the protection cap 30 includes a tubular portion 31 and a bottom portion 32 closing one end of the tubular portion 31 and is integrally molded of insulating resin such as vinyl chloride or polypropylene and flexible.

The other end of the tubular portion 31 facing the bottom portion 32 serves as an opening 33, and the interior space of the tubular portion 31 is narrowed from the opening 33 toward the bottom portion 32. The opening 33 has a right circular shape and the inner diameter thereof is so set that the waterproof rubber lid 20 is fittable into the opening 33. A positioning rib 34 continuously extending in the circumferential direction and adapted to position the waterproof rubber lid 20 projects from the inner circumferential surface of the tubular portion 31 near the opening 33.

Next, the method for forming the waterproof joint section A is described with reference to FIGS. 2(A) to 2(D).

First of all, after a slit 13 used for peeling is formed in the insulating coating 11a at a leading end side of each of the plurality of ground wires 11 connected with each other as shown in FIG. 2(A), the leading end sides of the respective ground wires 11 are inserted through the respective through holes 21 of the waterproof rubber lid 20 one by one until all the ground wires 11 are inserted through all the through holes 21 of the waterproof rubber lid 20.

Subsequently, as shown in FIG. 2(B), parts of the insulating coatings 11a of all the ground wires 11 projecting toward one side of the waterproof rubber lid 20 before the slits 13 are peeled off to expose the cores 11b.

Subsequently, as shown in FIG. 2(C), the exposed cores 11b are bundled and ultrasonic welding is applied thereto to form the terminal joint section 15. Instead of ultrasonic welding, resistance welding may be applied.

The thus formed terminal joint section 15 is inserted into the protection cap 30 through the opening 33 to be accommodated in the protection cap 30.

Figure 3:
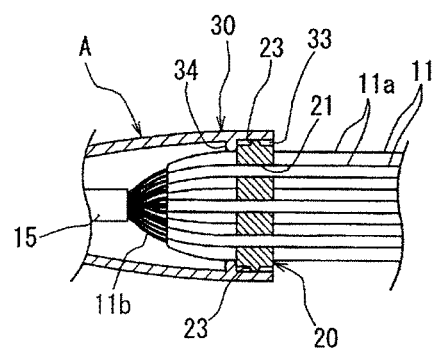
FIG. 3 is a section showing an essential part of a waterproof joint section sealing structure shown in FIG. 2(D)

Finally, as shown in FIG. 2(D), the waterproof rubber lid 20 mounted on the ground wires 11 is fitted into the opening 33 of the protection cap 30 and pushed until the end surface of the waterproof rubber lid 20 comes into contact with the positioning rib 34 as shown in FIG. 3, whereby the seal lip 23 of the waterproof rubber lid 20 is pressed into close contact with the inner circumferential surface of the opening 33 of the protection cap 30 to complete the waterproof joint section A.

In the protection cap 30 accommodating the terminal joint section 15 in this way, the opening 33 is sealed by the waterproof rubber lid 20 and the through holes 21 of the waterproof rubber lid 20 are sealed by the close contact with the inner circumferential surfaces of the through holes 21 with the outer surfaces of the insulating coatings 11a of the ground wires 11. Thus, it is possible to easily and reliably seal the protection cap 30 and prevent water penetration from the outside.

Accordingly, space and time for allowing the hardening of the waterproofing agent like the prior art become unnecessary, wherefore space saving and time shortening can be realized in the waterproofing process and production cost can be reduced.

Further, since the waterproof rubber lid 20 is not individually mounted one each of the ground wires 11, but all the wires 11 are inserted through the respective through holes of one waterproof rubber lid 20, the number of parts can be reduced, time and effort for the mounting operation can be reduced and, in addition, further space saving can be realized.

Although the ground wires 11 are welded to form the terminal joint section in the first embodiment, the terminal joint section may be formed by soldering instead of by welding or may be formed by crimping and connecting a terminal as disclosed in Japanese Unexamined Patent Publication No. 2005-228603.

Further, a seal lip may be formed on the inner circumferential surface of a waterproof rubber lid, and this waterproof rubber lid may be fitted on the opening end of the protection cap and the seal lip may be pressed into contact with the outer circumferential surface of the opening end of the protection cap to obtain a sealed state.

Figure 4:
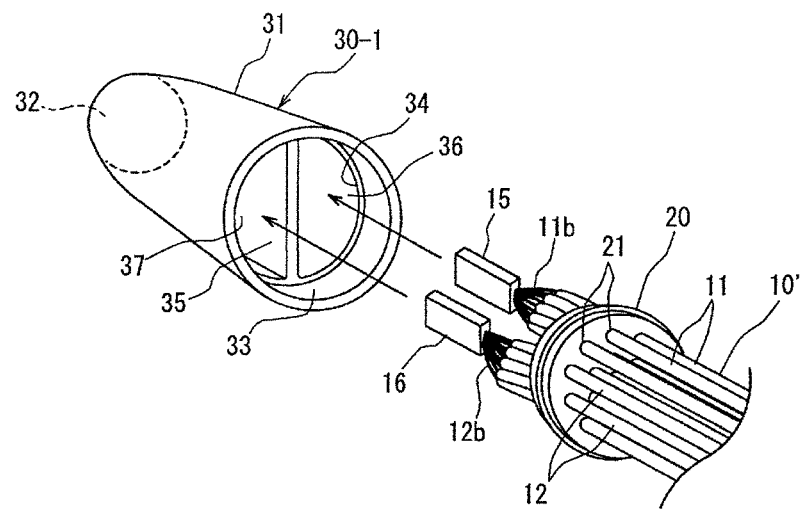
FIG. 4 is a perspective view showing a waterproof joint section forming method according to a second embodiment.
Figure 5:
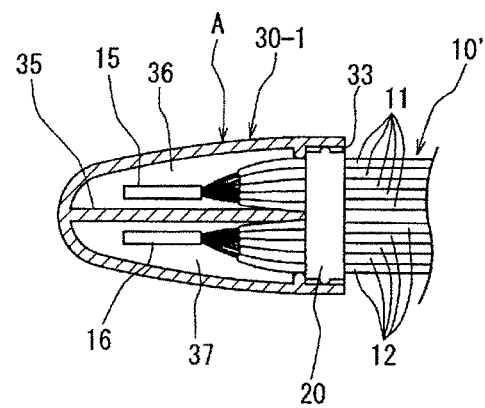
FIG. 5 is a section showing an accommodated state of a waterproof joint section in a protection cap according to the second embodiment.

FIGS. 4 and 5 show a second embodiment of the present invention.

In a wire harness 10-2 of the second embodiment, a terminal joint section is provided at a plurality of ground wires 11, a terminal joint section is also provided at a plurality of power wires 12, and these two terminal joint sections are accommodated in one protection cap.

Upon forming a waterproof joint section A of the wire harness 10-2, after the ground wires 11 and the power wires 12 are first respectively inserted through all through holes 21 of a waterproof rubber lid 20 as shown in FIG. 4, the passed-through leading end sides of the ground wires 11 and the power wires 12 are respectively grouped and cores 11b, 12b thereof are respectively exposed to form the terminal joint section 15 of the ground wires 11 and a terminal joint section 16 of the power wires 12.

A protection cap 30-1 for accommodating the separately formed terminal joint sections 15, 16 includes a partition wall 35 integral thereto and continuously extending from a positioning rib 34 formed on the inner circumferential surface of a tubular portion 31 to a bottom portion 32 and the interior space thereof is divided into two accommodating portions 36, 37 by this partition wall 35.

The terminal joint section 15 of the ground wires 11 is inserted into the accommodating portion 36 of the protection cap 30-1 and the terminal joint section 16 of the power wires 12 is inserted into the accommodating portion 37, whereby the terminal joint sections 15, 16 are separately accommodated in the different accommodating portions 36, 37 in one protection cap 30-1 as shown in FIG. 5. Thereafter, the waterproof rubber lid 20 is fitted into an opening 33 of the protection cap 30-1 to seal the protection cap 30-1. Other procedures and constructions are the same as in the first embodiment.

In this way, the terminal joint section 15 of a ground circuit and the terminal joint section 16 of a power supply circuit can be accommodated in an insulated state in one protection cap 30-1. Therefore, it is possible to reduce the number of parts and realize space saving.

Figure 6:
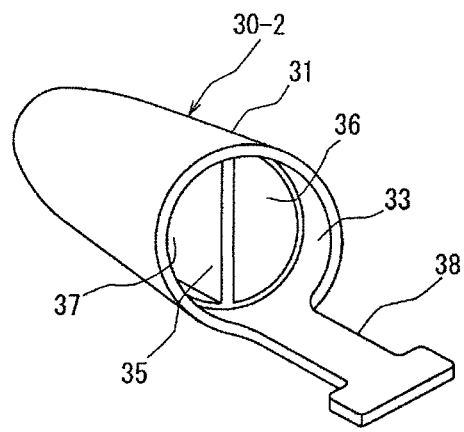
FIG. 6 is a perspective view showing a protection cap according to a third embodiment.
Figure 7:
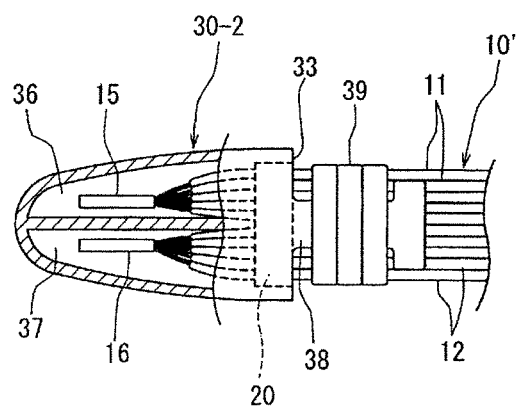
FIG. 7 is a diagram showing a waterproof joint section formed using the protection cap shown in FIG. 6.

FIGS. 6 and 7 show a third embodiment of the present invention.

In the third embodiment, a wire harness 10-2 is taped and fixed to a tape winding tongue piece 38 projecting from a protection cap 30-2.

Specifically, as shown in FIG. 6, the tape winding tongue piece 38 projects in an arrangement direction of the wire harness 10-2 from an end surface of the peripheral wall of a tubular portion 31 of the protection cap 30-2 at an opening 33.

The wire harness 10-2 according to this embodiment is as follows. Similar to the second embodiment, after a terminal joint section 15 of ground wires 11 and a terminal joint section 16 of power wires 12 are separately accommodated into accommodating portions 36, 37 of the protection cap 30-2 and the opening 33 of the protection cap 30-2 is sealed by a waterproof rubber lid 20, the wires 11, 12 drawn out from the protection cap 30-2 are fixed to the tape winding tongue piece 38 by winding a tape 39.

Since the wires 11, 12 can be positioned and fixed to the protection cap 30-2 and the waterproof rubber lid 20 in this way, the wires 11, 12 can be prevented from being displaced upon being pushed or pulled, thereby preventing a load from acting on the terminal joint sections 15, 16 accommodated in the protection cap 30-2.

Figure 8:
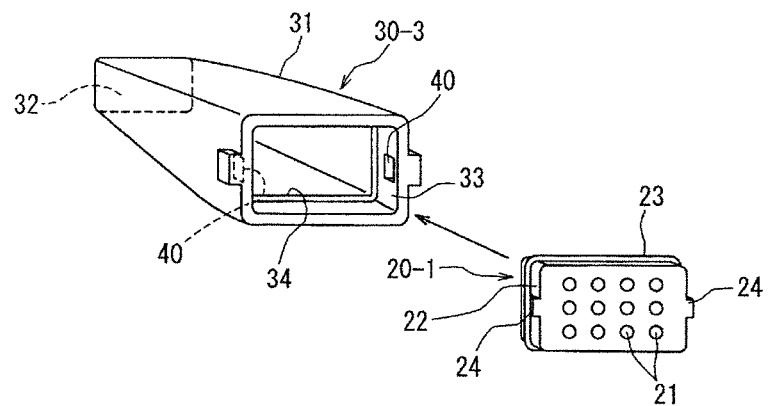
FIG. 8 is a perspective view showing a waterproof rubber lid and a protection cap according to a fourth embodiment.

FIG. 8 shows a waterproof rubber lid 20-1 and a protection cap 30-3 according to a fourth embodiment of the present invention.

The waterproof rubber lid 20-1 has a rectangular cross section and a pair of resiliently deformable locking pieces 24 project from an outer circumferential surface 22 at positions opposite to each other. In addition, the waterproof rubber lid 20-1 includes through holes 21 and a seal lip 23 similar to the waterproof rubber lid 20 of the above embodiment.

The protection cap 30-3 is such that an opening 33 has a rectangular shape in conformity with the shape of the waterproof rubber lid 20-1 and the interior space is narrowed toward a bottom portion 32. The inner side of the peripheral wall of a tubular portion 31 of the protection cap 30-3 is recessed at positions corresponding to the locking pieces 24 of the waterproof rubber lid 20-1, thereby forming interlocking portions 40, into which the locking pieces 24 are inserted to be locked. The other construction is the same as the protection caps 30, 30-1.

By using the waterproof rubber lid 20-1 and the protection cap 30-3 constructed as above, displacement and detachment of the waterproof rubber lid 20-1 that are likely to occur due to vibration of a running vehicle and/or impact can be reliably prevented.

Figure 9A:
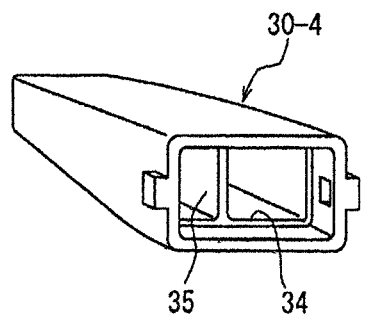
FIGS. 9(A) and 9(B) are perspective views showing other examples of the protection cap.
Figure 9B:
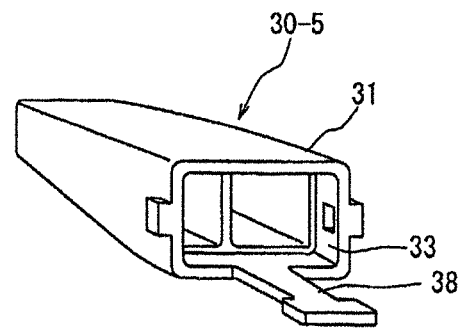
Figure 10:
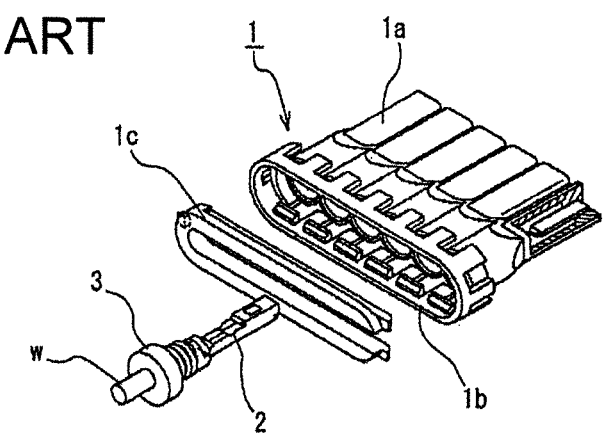
FIG. 10 is a diagram showing a prior art.
Figure 11:
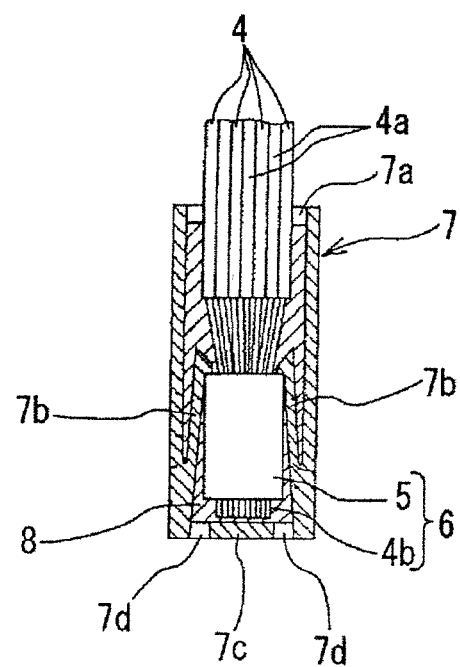
FIG. 11 is a diagram showing another prior art.

FIGS. 9(A) and 9(B) show other examples of protection caps corresponding to the rectangular waterproof rubber lid 20-1.

Since the interior space of a protection cap 30-4 shown in FIG. 9(A) is divided into two by a partition wall 35 similar to the protection cap 30-1, two terminal joint sections of different circuits can be accommodated.

In a protection cap 30-5 shown in FIG. 9(B), a tape winding tongue piece 38 projects from an end of the peripheral wall of a tubular portion 31 at an opening 33 similar to the protection cap 30-2.

A wire harness according to the present invention including a waterproofed part formed by accommodating a terminal joint section into a protection cap and closing and sealing the protection cap with a waterproof rubber lid is suitably used not only as a wire harness to be arranged in an automotive vehicle, but also as a wire harness to be arranged in an electric vehicle such as a two-wheel vehicle, a buggy or a water ski.

What is claimed is:

1. A waterproof joint section forming method, comprising:
    forming slits for peeling in leading end sides of a plurality of insulated wires to be electrically connected with each other;
    providing a waterproof rubber lid having opposite front and rear faces and a plurality of through holes extending through the water proof rubber lid from the front face to the rear face, the waterproof rubber lid having and outer circumferential surface and a waterproof sealing lip extending around the outer circumferential surface;
    providing a resin molded protection cap having a tubular side wall, a closed bottom wall and an opening end opposite the closed bottom wall, the bottom wall being free of openings therethrough, a positioning rib extending around an inner periphery of the tubular side wall at a distance from the opening end substantially equal to a distance between the front and rear faces of the waterproof rubber lid;
    inserting the leading ends of the insulated wires respectively through the through holes formed in the waterproof rubber lid so that portions of outer circumferential surfaces of insulating coatings of the respective wires are held in close contact with inner circumferential surfaces of the respective through holes of the waterproof rubber lid for sealing,
    peeling off the insulating coatings at the ends of the wires from the slits after being passed through the through holes to expose cores,
    connecting the exposed cores directly to one another by welding, fusion-bonding, soldering, or fastening by a crimping terminal to form a terminal joint section,
    inserting the terminal joint section through the opening end in the protection cap, and
    fitting the waterproof rubber lid in the opening end of the protection cap so that the front face of the waterproof rubber lid contacts the positioning rib and so that the waterproof seal lip formed on the outer circumferential surface of the waterproof rubber lid is pressed into contact with an inner circumferential surface of the tubular side wall of the protection cap between the opening end of the protection cap and the positioning rib for sealing the terminal joint section in the protection cap without injecting a waterproofing agent into the protection cap.

2. A waterproof joint section forming method according to claim 1, wherein:
    the protection cap includes a partition wall inside,
    dividing the plurality of wires inserted through the waterproof rubber lid into a plurality of groups with a terminal joint section formed for each group, and
    inserting a plurality of these terminal joint sections into accommodating portions defined in one protection cap by the partition wall and then sealing the protection cap with the waterproof rubber lid.

3. A wire harness provided with a waterproof joint section formed by a method according to claim 1.

4. A wire harness provided with a waterproof joint section according to claim 3, wherein a locking piece projects from the outer circumferential surface of a waterproof rubber lid and is engaged with an interlocking portion formed at the peripheral wall of a protection cap.

5. A wire harness provided with a waterproof joint section according to claim 3, wherein:
   a waterproof rubber lid has a circular or rectangular shape, and
   an opening end of a protection cap is so shaped that the waterproof rubber lid is fittable therein.

6. A wire harness provided with a waterproof joint section according to claim 3, wherein:
   an interior space of a protection cap is narrowed toward a bottom side, and
   a tongue piece, to which a group of wires drawn out from the protection cap are fixed by taping, projects from a peripheral wall of the protection cap at the opening end.

\* \* \* \* \*